Oct. 31, 1967     L. J. JENARD ET AL     3,350,215
METHOD OF MAKING COHESIVE FABRIC
Original Filed April 17, 1963     5 Sheets-Sheet 1
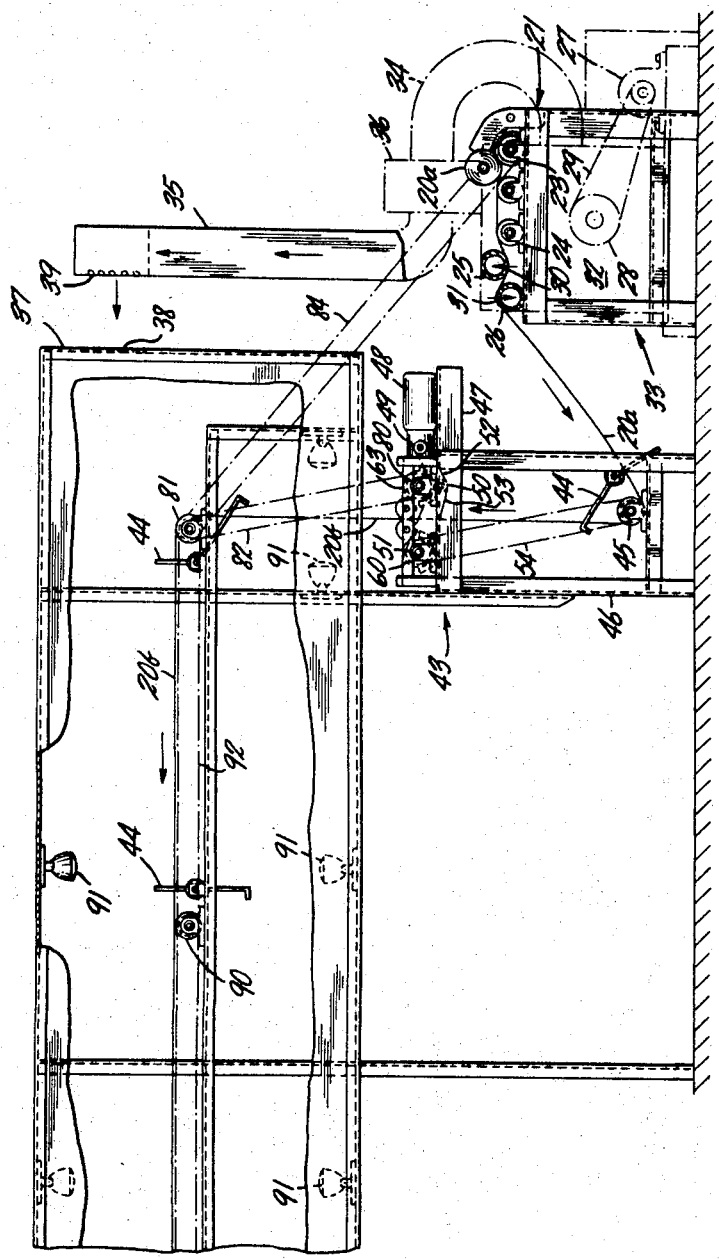
FIG. IA
INVENTORS.
LEONARD J. JENARD &
FRANCIS W. JENARD
BY
their    ATTORNEYS Oct. 31, 1967  L. J. JENARD ET AL  3,350,215

METHOD OF MAKING COHESIVE FABRIC

Original Filed April 17, 1963  5 Sheets-Sheet 2

INVENTORS.
LEONARD J. JENARD &
FRANCIS W. JENARD
BY their ATTORNEYS

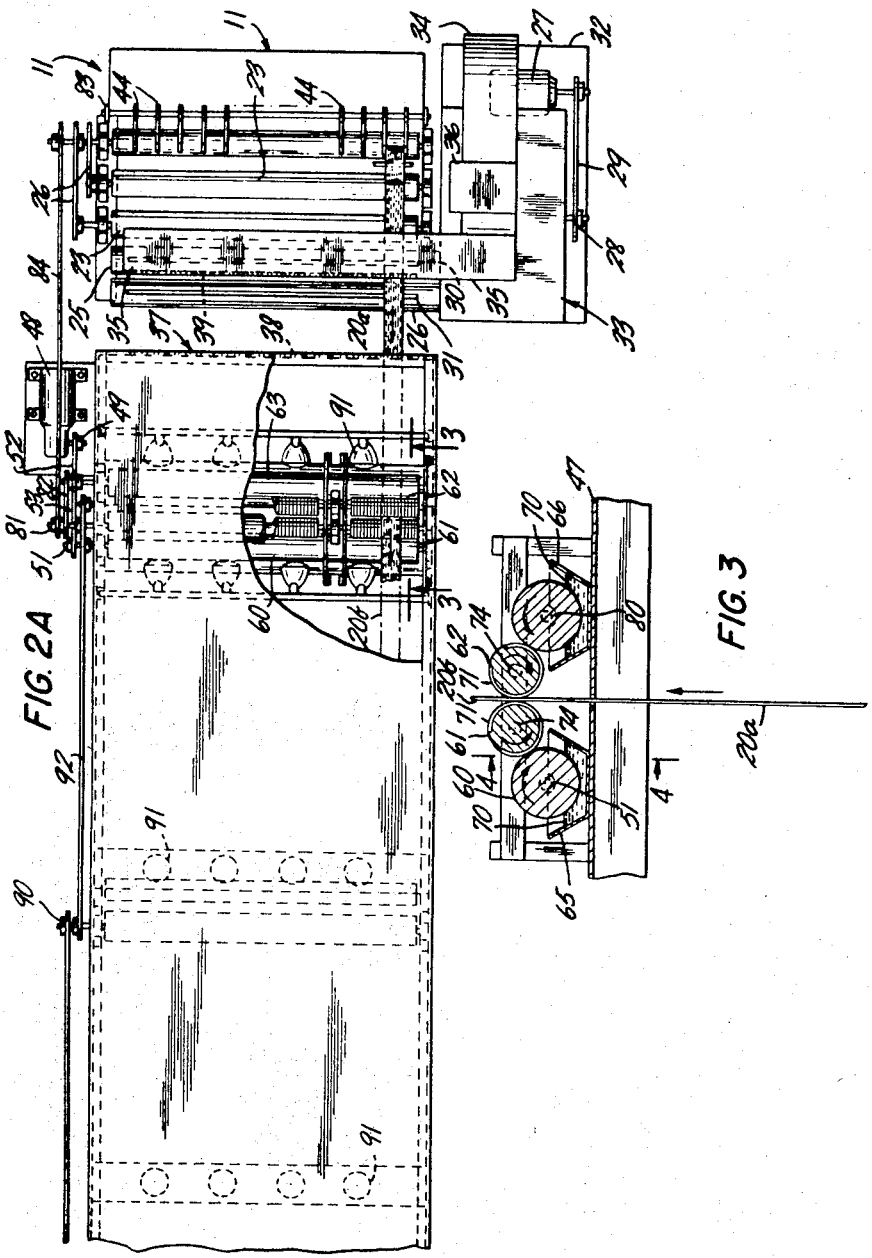

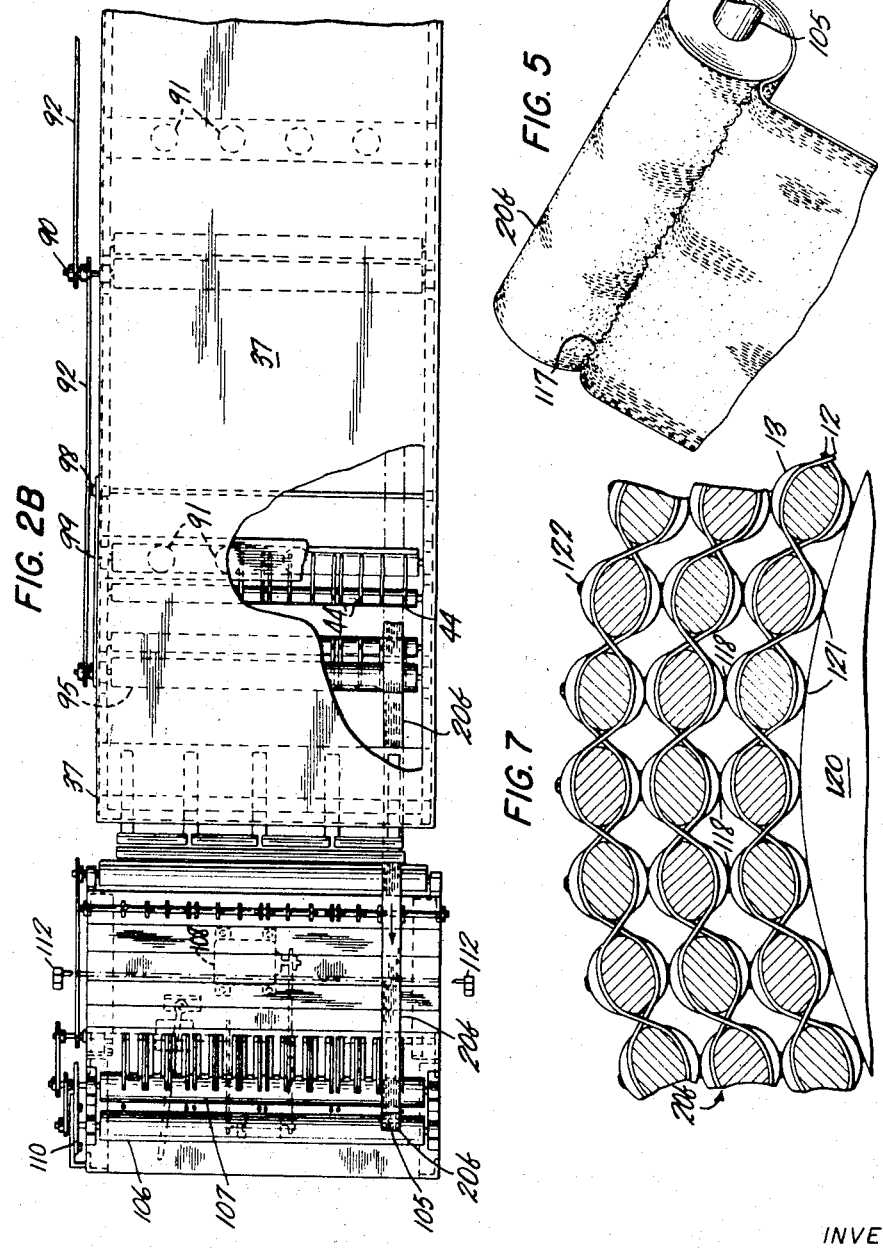

Oct. 31, 1967     L. J. JENARD ET AL     3,350,215
METHOD OF MAKING COHESIVE FABRIC
Original Filed April 17, 1963     5 Sheets-Sheet 5
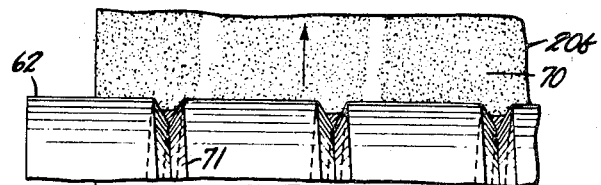
FIG. 4
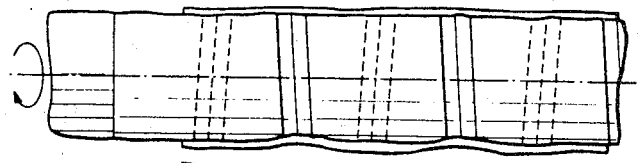
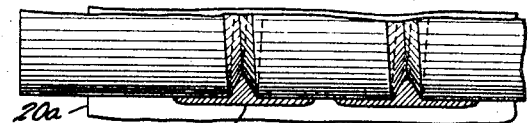
FIG. 8
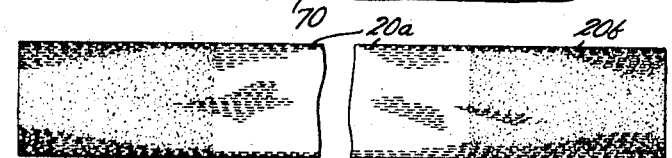
FIG. 6
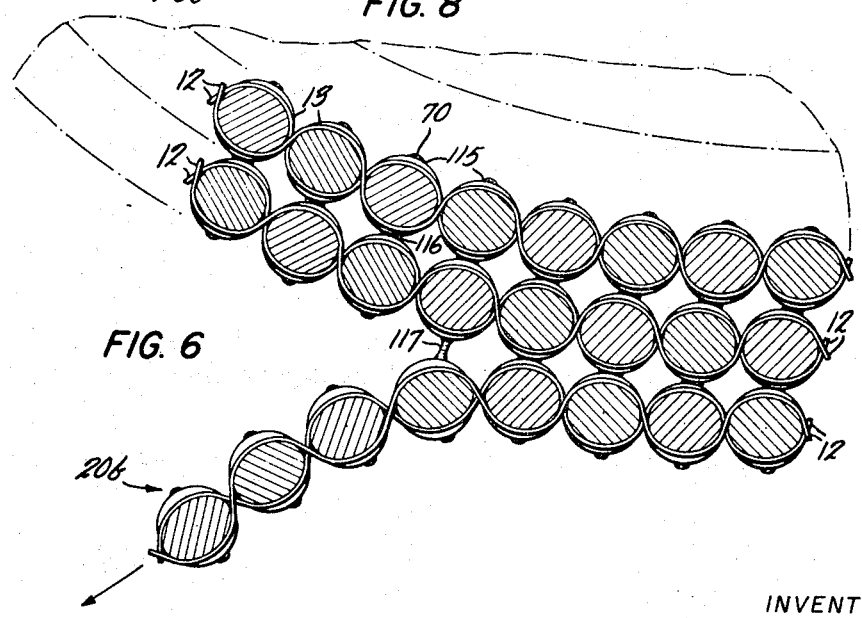
INVENTORS.
LEONARD J. JENARD &
FRANCIS W. JENARD
BY
their    ATTORNEYS

United States Patent Office 3,350,215
Patented Oct. 31, 1967

3,350,215
METHOD OF MAKING COHESIVE FABRIC
Leonard J. Jenard, Lincoln, and Francis W. Jenard, Saylesville, R.I., assignors to Paulis Silk Company, Central Falls, and Pawtucket, R.I., a corporation of Rhode Island
Original application Apr. 17, 1963, Ser. No. 273,786. Divided and this application May 5, 1966, Ser. No. 547,822
6 Claims. (Cl. 117—37)

This is a division of our co-pending application Ser. No. 273,786 filed on Apr. 17, 1963.

The invention relates in general to elastic fabrics and more particularly to a self-adhering elastic fabric which stretches and retracts in at least one direction.

Elastic fabrics have long been known in the prior art. For example, it is common practice to form resilient woven fabrics by mixing cotton and rubber or elastic "warp" threads in various ratios and loosely weaving these warp threads through larger cotton filler threads sometimes called "woofs."

The resulting fabric is stretchable and resilient in a direction parallel to the warp threads and is exceptionally useful for maintaining a constant pressure on a particular area of the body once it has been wound around this area in a stretched condition and has been locked in place.

The common use of this type of elastic cloth to treat such ailments as sprains and pulled muscles, especially in the field of athletics, has resulted in the fabric being referred to as an "elastic bandage" or "bandage."

Heretofore it has been necessary to lock this elastic bandage in place, after it has been stretched about a muscle, by using one or more clips with hooks at both ends to fasten the outer end of the elastic bandage to the penultimate layer of bandage wound on the muscle. This method of fastening is time consuming and requires a great deal of manual dexterity, especially on the part of an injured person attempting to wrap the bandage himself. Furthermore, these clips often become separated from the bandage thereupon rendering it useless as a binding cloth.

The present invention circumvents all of these problems by providing an elastic fabric with a fastening element which is firmly attached to the fabric itself. Quite briefly this invention discloses a woven elastic fabric coated with a cohesive substance in spaced portions and generally on only the raised or the highest portions of the threads on both sides of the fabric. When this coated elastic fabric is wound about an injured body area the bandage may be readily fastened and held in place by merely pressing two oppositely positioned coated surfaces together. This simple pressure will unite the randomly disposed cohesive substances on each surface and thus removes the necessity of fastening, unfastening, adjusting and storing clips with exposed sharp hooks.

It is a feature of this invention that the coated elastic bandage described herein is self-adhering in that it will only unite with a similarly coated surface of the bandage. Since it is non-cohesive with the skin, clothes or similar surfaces, all of the problems normally experienced with sticky adhesive tapes and the like are avoided.

It is a further feature of this invention that the adhesive coating substance does not fill the interstices of the elastic fabric but is primarily positioned on the more extended or higher portions of the threads therein. This bandage thus keeps the threads within the fabric independent and permits the passage of air through the fabric. Thus, this bandage can service the various types of wounds which need air and at the same time need the support provided by an elastic fabric. Standard impervious non-elastic adhesive bandages would be totally inadequate in such a case.

It is a further feature of this invention that this self-adhering elastic bandage is reusable over and over again and that although the adjacent coated surfaces of the applied bandage are firmly united, the surfaces may be separated without difficulty by merely pulling the surfaces apart and rewinding the used bandage in a roll.

The coated bandage disclosed herein has the further advantage that it is approximately sixteen percent stronger than the presently known non-coated versions. This feature will result in longer wear and permit firmer binding when the bandage is applied.

Still further, this invention not only provides a fastening means for the elastic bandage by replacing the standard clip, but actually increases the pressure exerting capabilities of the elastic bandage. In the prior art each layer of elastic bandage wrapped around the injured area of the body was not fastened to each of its adjacent layers excluding normal frictional engagements. This prior art arrangement allowed a certain freedom of movement between these adjacent layers and could eventually permit the bandage to work loose during an extended period of muscular movement within the bandage. Even a gradual loosening of the inner wrappings without movement would be possible over a period of time.

The elastic bandage of this invention which is coated on both of its sides allows the locking of each successive layer of bandage to its neighboring layers at all points of surface to surface engagement, thus insuring against the possibility of gradual slippage. Thus, in this invention, the multiple-layered binding around the muscle may be pressed to form the equivalent of a single thick elastic bandage and thus provide greater support than has been heretofore possible when using the standard bandage. In this regard, it is another feature of this invention that the amount of cohesion between adjacent layers can be varied by varying the amount of compressive force applied between adjoining layers when winding the bandage on the muscle.

Other objects and a fuller understanding of the invention may be had by referring to the following description and claims, taken in conjunction with the accompanying drawings, in which:

FIGURE 1A is a partially cross-sectioned elevational view of the first part of an apparatus designed to produce the self-adhering elastic bandage described herein;

FIGURE 2A is a partially cross-sectioned plan view of the first part of the apparatus shown in FIG. 1A;

FIGURE 2B is a partially cross-sectioned plan view of the second part of the apparatus shown in FIG. 1A;

FIGURE 3 is a cross-sectioned elevation taken along the line 3—3 in FIG. 2A;

FIGURE 4 is a partial elevational view of a coating roller taken along the line 4—4 in FIG. 3;

FIGURE 5 is an isometric view of the coated elastic fabric of this invention being pulled off a storage roll;

FIGURE 6 is a detailed cross-sectioned schematic elevation of the coated elastic fabric of this invention being pulled off a storage roll where the fabric is stored in a relatively non-stretched condition;

FIGURE 7 shows a detailed cross-sectioned schematic elevation of three layers of the coated elastic fabric of this invention applied in a relatively stretched condition over the portion of a body muscle; and FIGURE 8 illustrates an alternate embodiment of this invention where an adhesive substance is applied on only the two end portions of a strip of elastic fabric.

Figure 1B:
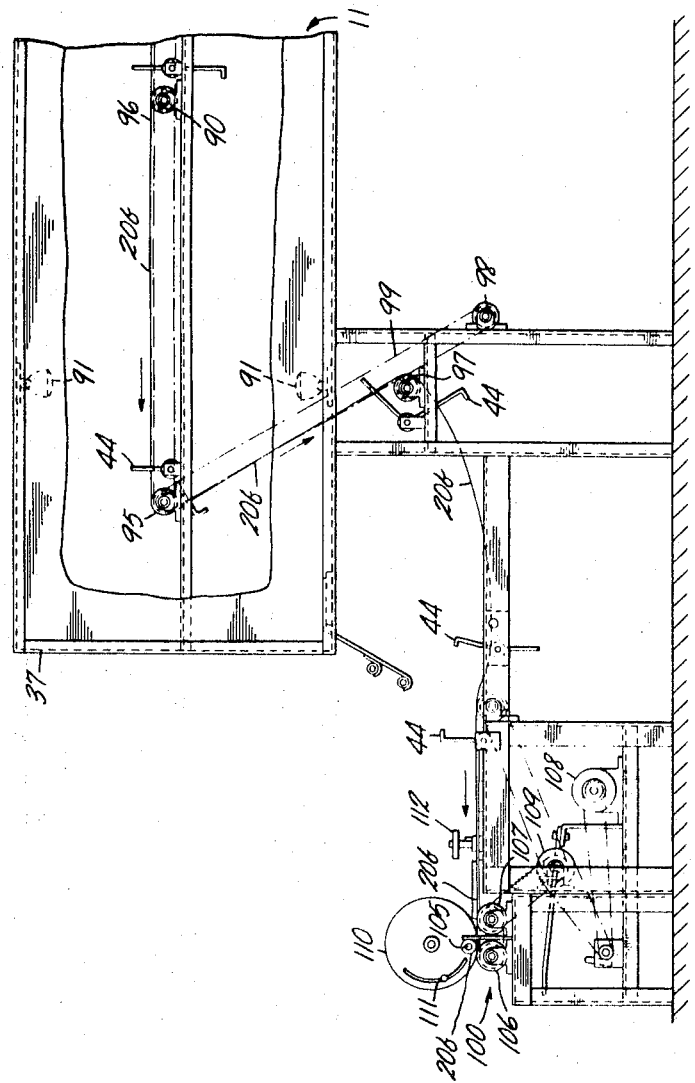
FIGURE 1B is a partially cross-sectioned view of the second part of the apparatus shown in FIG. 1A.

With reference to the drawings, the inventive roll of self-adhering elastic fabric is shown generally in FIG. 5, and indicated by the reference character 10 whereas the apparatus for producing this roll is shown generally in FIGS. 1A–B and FIGS. 2A–B, and indicated by the reference character 11.

As illustrated in detail in FIGS. 6 and 7 the roll of self-adhering elastic fabric 20b is composed in part of a standard elastic bandage 20a having a plurality of warps or longitudinal threads 12 loosely woven through a plurality of woofs or cotton filler 13. The warps of the standard elastic bandage may be composed of cotton and rubber or similar elastic threads and, if this is the case, a ratio of approximately 3 cotton to 1 elastic has been found to be the most desirable. The warps are loosely woven in comparison with the shorter and much larger transverse woof threads of cotton filler. It is this loose weaving of the warp threads which permits the stretching of the standard elastic bandage, while the resilient quality of the bandage is provided primarily by the rubber strands or their synthetic equivalent.

A pre-wound roll of this standard type of elastic bandage 20a is placed in unwinding apparatus 21 at a first processing station as shown in FIG. 1A. The center of roll 20a is locked in place in position 22 so that the outer layer of the roll is held constantly adjacent unwinding powered roller 23. The leading edge of the strip of elastic bandage or fabric is wound over rollers 24 and under and over suction elements 25 and 26, respectively. Driving motor 48 through the agency of numerous belts, gears and rollers provides the impetus for rotating rollers 23 and for moving the strip of elastic fabric 20a through the unwinding and filtering apparatus.

The second processing station is directly adjacent the unwinding station and is composed in part of tubular suction element 25 which is hollow and provided with an elongated aperture 30. This aperture intimately engages the upper surface of the strip of elastic bandage 20a as it travels beneath the suction element 25. Similarly, suction element 26 is provided with an upper elongated aperture 31 which engages the lower surface of fabric 20a as it moves past this element. Both the hollow center of suction element 25 and the hollow center of suction element 26 are connected through chamber 32, as shown in FIG. 2A, to a vacuum motor means 33. It is this vacuum means 33 which provides the suction at orifices 30 and 31 which removes loose foreign particles of lint and dust from both the upper and the lower surfaces of the flat elastic fabric 20a. A standard vacuum pump 27 powers the vacuum apparatus through gearing 28 and belt 29.

The exhaust from vacuum apparatus 33 passes through tubing 34 and through filtering element 36 where the particles are collected. The clean air is then sent through tubing 35 to louver openings 39. These openings are mated with openings 38 in the side surface of drying oven 37 with the result that the air from the vacuum exhaust is forced through the drying oven. In this way the vacuum pump 33 serves two functions by first removing the lint and random particles from the elastic tape before it is coated with a cohesive substance and secondly by providing circulation of air in the drying chamber or oven 37.

The elastic fabric 20a is next curved around lower pulley 45 on stand 46 to insure that it is moving in a generally vertical direction when the fabric passes through coating station 43 or on the way toward the overhead drying oven 37. The stand 46 also supports table 47 and driving motor 48 which is mounted thereon. This motor rotates shaft 49 which in turn rotates shafts 50 and 51 through the agency of belts 52 and 53. It is this shaft 51 and its related gearing which impels the rotation of lower pulley 45 through belt 54.

Table 47 also supports troughs 65 and 66 which contain a cohesive substance 70 which may be maintained at a relatively constant level by either manual or automatic means. Two rotatable dip rollers 60 and 63 are partially submerged in this cohesive substance 70 and arranged so that, upon rotation, the outer surfaces of these dip rollers are continually covered with cohesive substance. Directly adjacent to each dip roller 60 and 63 are coating rollers 61 and 62 which rotate about two parallel and generally horizontal axes. The cylindrical surface of each coating roller is, however, in a slightly spaced relationship to the cylindrical surface of the other coating roller.

Both shaft 51 of dip roller 60 and shaft 80 of dip roller 63 are connected by belts to driving shaft 50 and the power linkage driven by motor 48. The gearing is so arranged that both dip rollers rotate at approximately the same speed but in opposite directions. Dip roller 60 rotates clockwise, as shown in FIG. 3 and imparts a counterclockwise rotation to adjacent coating roller 61, while dip roller 63 rotates counterclockwise and imparts a clockwise rotation to coating roller 62.

As the elastic fabric 20a is pulled upwardly between coating rollers 61 and 62, it is pressed into intimate contact with both coating surfaces which are, in turn, continually covered with the cohesive substance 70 delivered from the dip rollers 60 and 63. In this manner the cohesive substance is applied in even, but spaced portions to the elastic fabric, thereby producing the coated elastic fabric 20b.

The cylindrical surfaces of both coating rollers 61 and 62 are provided with grooves 71 which greatly improve the pickup and delivery characteristics of the coating rollers. The specific grooves in the embodiment shown are very fine having only a slight depth and are spaced so that there are approximately 16 grooves per inch across the cylindrical surface of the roller. Although in this embodiment these grooves comprise only about 5 to 10% of the surface area of the cutting roller, they provide the means by which the cohesive substance temporarily adheres to the coating roller. This does not mean that the cohesive substance is carried only in the grooves, but only that the grooves are necessary for a proper coating of the elastic fabric in spaced portions over its surface. The grooves 71 are helical in the embodiment shown in FIG. 4 although successive circular grooves of varying depths and other arrangements are envisioned in other embodiments.

It is another feature of this invention that the apparatus described above places only a certain amount of cohesive substance on the strip of elastic fabric passing therethrough. Specifically, in the preferred embodiment, the apparatus is designed to increase the weight of the elastic fabric, when applying the adhesive substance, by approximately 10%, although increases in weight of up to 25% are contemplated in other embodiments. In this general manner a final product is produced which is composed of approximately 85 to 95% elastic bandage and approximately 5 to 15% cohesive substance depending on the desires of the operator.

Although many various types of cohesive substances are envisioned, one such cohesive substance which has proved to be successful is composed of approximately 100 parts per hundred of dry rubber as latex, 1 part per hundred of potassium salt of oleic acid, 2 parts per hundred of 2,2′-methylenebis(4-ethyl-6-tert-butylphenol), 0.05 part per hundred of emulsified silicone oils in hydrocarbon solvents and 0.5 part per hundred of sodium polyacrylate.

In the preferred embodiment this cohesive substance 70 is delivered to both sides of the elastic fabric although alternate embodiments are envisioned where only one side of the elastic fabric is so coated or only a portion of one side, or only a portion of both sides are so coated. These alternate embodiments are considered to be totally within the scope of this invention. FIG. 8 illustrates one such alternate embodiment where only the two ends of the elastic bandage are coated with spaced portions of cohesive substance.

The coated elastic fabric 20b then moves to the drying station and immediately after coating enters drying oven 37. The shaft 80 which supports dip roller 63 is connected by related gearing and belt 82 to upper driving pulley 81. It is this upper pulley 81 located in chamber 37 which defines the limit of the vertical movement of the bandage and changes the direction of its movement into a generally horizontal plane. This upper pulley 81 also drives the unwinding pulley 23 in the unwinding section through the agency of belt 84. In this manner all of the driving pulleys on the entire delivery system can have synchronized rotation, thus preventing undesirable stretching of the elastic bandage. It is a feature of this invention that the elastic bandage described herein is coated and rolled for packaging while in its natural unstretched condition.

Once in the drying chamber 37 the elastic fabric 20 is supported by intermittent conveying rollers 90, which are also rotated by belt 96. Also, within the drying chamber 37, sets of heating elements 91 are spaced at approximately equal distances from both sides of the coated fabric 20b in order to provide even drying and a uniform product. These heating elements 91 act in conjunction with the air flow through the chamber 37 to maintain a constant temperature of approximately 95° F. Approximately a 47 second exposure period for the coated elastic fabric 20b has proved to be successful although variation in both time and temperature are to be expected when other cohesive substances are used.

Elastic fabric 20b changes direction about end roller 95 and passes out of drying chamber 37 through an opening in its lower surface. The coated elastic fabric 20b is then directed by roller 97, which is driven along with roller 98 by belt 99, to the winding, measuring and cutting station 100 where it is wrapped on core 105. The winding is effected by placing the coated elastic fabric in frictional contact with winding rollers 106 and 107 which are powered by motor 108 through the agency of gear 109 and a series of interlinking belts and shafts. The elastic fabric 20b is wound around empty core 105 until the desired length is indicated by dial 111 on measuring device 110. At this point cutting element 112 then severs the elastic bandage and the completed roll is ready for packaging.

FIGS. 2A and 2B illustrate an apparatus designed for producing a plurality of rolls of coated elastic fabrics. In this unit a number of coating rollers are provided, each of which can accommodate a plurality of elastic strips. To assist in guiding the multiple strips passing through the disclosed apparatus a plurality of guide elements 44 are provided at various points along the path traversed by the fabric.

FIG. 6 shows a detailed schematic view of a roll of coated elastic fabric 20b being unwound. It is apparent from this illustration that the roll of fabric is wound in an unstretched condition as can be seen from the wide cross-sections of woof threads 13 as they lie on the roll. The elastic or cotton warp threads 12 are loosely woven and make only a slight indentation in the woofs. The cohesive substance 70 is shown placed on the raised or extended portions 115 of the threads and adjacent layers unit in bonds 116.

When the coated elastic bandage is unwound the warp threads 12 are pulled tighter around the larger woofs 13 as shown in FIG. 6. Also the cohesive bound between two neighboring layers gradually yields as shown at point 117, as the outer layer is removed. This yielding of the band between adjacent layers can also be seen in FIG. 5, which illustrates a far more realistic view of the full size coated elastic bandage being unwound.

FIG. 7 shows a portion of three layers of bandage disclosed herein wound around a body muscle 120. Here each layer is in a stretched condition and thereby exerts an inward pressure on the muscle. In addition all three layers are bonded together at a plurality of points 118 in such a manner that all three layers act as a unit or composite bandage which provides much greater support than the standard elastic bandage now available. Furthermore, with points 118 holding adjacent layers in place, there is no tendency for a layer to slip and thereby loosen the entire bandage.

The number and strength of the bonded points 118 can, of course, be varied by applying different pressures to each layer as it is wound on earlier windings. The coated elastic bandage of this invention thus permits the applicator to determine the amount of layer cohesion which he desires and which is necessary for a particular part of the body.

It should be emphasized that the cohesive substance 70 at points 121 adjacent muscle 120 does not adhere to the skin surrounding the muscle, nor does the cohesive substance at points 122 adhere to the clothes of the wearer.

In viewing FIGS. 6 and 7 it should be remembered that the arrangement is schematic and that thread to thread, or high point to high point engagement will not always occur. However, over the whole surface of the bandage, the points of cohesion will be innumerable. Also, FIGS. 6 and 7 have exaggerated the diametric area of the woof thread with respect to the diametric area of the warp threads in order to disclose this invention more clearly.

Although the invention has been described with a certain degree of particularity, it is understood that the present disclosure has been made only by way of example, and that numerous changes in the details of construction and the combination and arrangement of parts, some of which were mentioned above, may be resorted to without departing from the spirit and scope of the invention as hereinafter claimed.

We claim:

1. A process for producing a self-adhering elastic fabric comprising the steps of conducting the fabric without any substantial stretching through the nip between a pair of coacting coating rolls, applying a film of cohesive substance to each of the coacting rolls in an amount sufficient to transfer to the fabric cohesive substance coatings on both sides thereof in an amount of between about 5% and about 15% cohesive substance by weight of the total weight per unit area of the coated fabric, the cohesive substance being coated primarily onto only the raised parts of the fabric yarns without substantially impregnating or filling the interstices between the yarns, and exposing the coated fabric to heat to dry the cohesive substance.

2. A process according to claim 1 wherein the cohesive substance consists essentially of 100 parts per hundred dry rubber as latex, 1 part per hundred potassium salt of oleic acid, 2 parts per hundred of 2,2'-methylenebis(4-ethyl-6-tert-butylphenol), 0.05 part per hundred emulsified silicone oils in hydrocarbon solvents, and 0.5 part per hundred sodium polyacrylate.

3. A process according to claim 1 further comprising the step of applying suction to each side of the fabric for removing lint and other loose particles therefrom before conducting it through the coating rolls.

4. A process according to claim 1 wherein the axes of the coating rolls are located substantially in a common horizontal plane and wherein the fabric is moved substantially vertically through the nip between the coating rolls.

5. A process according to claim 1 wherein the coated fabric is exposed to a gas heated to 95° F. for 47 seconds.

6. A process for producing a self-adhering elastic fabric comprising the steps of conducting the fabric without any substantial stretching substantially vertically through the nip between a pair of coacting rolls disposed on parallel axes lying substantially in a common horizontal plane, rotating a dip roll in a reservoir of cohesive substance to pick up a coating of the substance, transferring the cohesive substance from the dip roll to a coating roll in an amount sufficient to provide a coating on both sides of the fabric of between about 5% and about 15% by weight of cohesive substance to the total weight per unit area of the coated fabric, the cohesive substance being coated primarily on the raised parts of the fabric yarns without substantially impregnating or filling the interstices between the yarns, and exposing the coated fabric to heat for a predetermined time to dry the cohesive substance.

References Cited

UNITED STATES PATENTS

| | | | |
|---|---|---|---|
| 2,413,970 | 1/1947 | Hawley | 161 |
| 2,592,801 | 4/1952 | Hanington | 117—37 |
| 2,934,066 | 4/1960 | Stowasser | 128—156 |
| 2,940,868 | 6/1960 | Patchell | 128—156 |
| 3,052,565 | 9/1962 | Chinn et al. | 117—37 |
| 3,086,529 | 4/1963 | Munz et al. | 128—327 |
| 3,138,476 | 6/1964 | Phipps | 117—38 |
| 3,232,291 | 2/1966 | Parker | 128—156 |

RALPH S. KENDALL, *Primary Examiner.*

ALFRED L. LEAVITT, *Examiner.*

A. H. ROSENSTEIN, *Assistant Examiner.*